Figure 1:
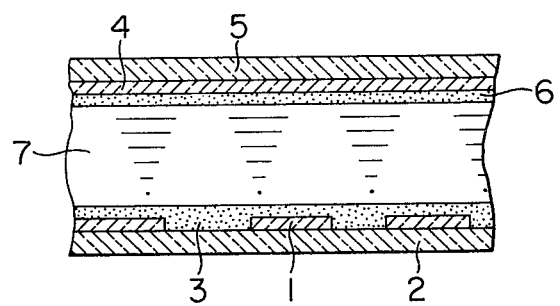

United States Patent [19]
Hattori et al.

[11] 3,982,820
[45] Sept. 28, 1976

[54] LIQUID CRYSTAL DISPLAY DEVICE

[75] Inventors: Katsuji Hattori, Uji; Masakazu Fukai, Nishinomiya; Akio Moriyama, Katano; Yasuhiro Nishizawa, Hirakata, all of Japan

[73] Assignee: Matsushita Electric Industrial Company, Ltd., Osaka, Japan

[22] Filed: Aug. 26, 1975

[21] Appl. No.: 607,940

[30] Foreign Application Priority Data
Aug. 29, 1974 Japan .............................. 49-99662

[52] U.S. Cl. .............................. 350/160 LC; 428/1
[51] Int. Cl.² .......................................... G02F 1/13
[58] Field of Search ............... 350/160 LC; 428/1

[56] References Cited
UNITED STATES PATENTS

| | | |
|---|---|---|
| 3,834,792 | 9/1974 | Janning .................. 350/160 LC |
| 3,853,391 | 12/1974 | Sorkin ..................... 350/160 LC |
| 3,854,793 | 12/1974 | Rahn ....................... 350/160 LC |
| 3,864,021 | 2/1975 | Katagiri et al. .......... 350/160 LC |
| 3,864,905 | 2/1975 | Richardson ............ 350/160 LC X |

*Primary Examiner*—Edward S. Bauer
*Attorney, Agent, or Firm*—Stevens, Davis, Miller & Mosher

[57] ABSTRACT

A liquid crystal display device comprising a pair of transparent substrates each provided with a transparent conductive film on the interior surface, boron nitride coating layers disposed on inner surfaces of the substrates and the conductive films, and a liquid crystal material interposed between the coating layers, the boron nitride layer being given preferred directions for aligning the molecules of the liquid crystal material. This structure increases the chemical stability and improves the alignment of the molecules of the liquid crystal material to a great extent.

4 Claims, 2 Drawing Figures

LIQUID CRYSTAL DISPLAY DEVICE

This invention relates to a liquid crystal display device, and more particularly to a liquid crystal display device capable of providing effective alignment of liquid crystal molecules.

Among the conventional liquid crystal display devices, there are "twisted type" and homogeneous type liquid crystal display devices. In a twisted type liquid crystal device, certain preferred directions are given to the interior surfaces of a pair of glass substrates provided with transparent conductive film so that the molecules of a liquid crystal material confined between the pair of substrates are aligned in parallel with the substrate and show gradual change of direction from one substrate to the other so as to have a twisting angle of 90° in total. In a homogeneous type liquid crystal display device, the molecules of a liquid crystal material are aligned in a single direction.

Various procedures have been adopted conventionally for giving a preferred alignment direction to a surface of a substrate, such as rubbing the surface of a substrate with gauze or paper, or depositing a thin film of polyvinylalcohol, etc, on the surface of a substrate and rubbing thereon in a certain direction. The former method has such disadvantages that a uniform alignment of the molecules of a liquid crystal material can hardly be achieved over the entire display cell and that the service life for aligning the molecules of a liquid crystal material is short. The latter method also has such disadvantages that the service life for aligning the molecules of a liquid crystal material is short and that polyvinylalcohol contains a certain amount of water and becomes a source of the cause of a decrease in the electrical resistance of the device, thereby lowering the reliability of the device and/or decreasing the service life of alignment. There has also been reported a liquid crystal display device utilizing polycarbonmonofluoride. Such a device, however, has problems in hermetic sealing.

An object of this invention is, therefore, to provide a liquid crystal display device capable of uniformly aligning the molecules of a liquid crystal material and having a long service life of alignment of the molecules of a liquid crystal material.

Another object of this invention is to provide a liquid crystal display device capable of excellently aligning the molecules of a liquid crystal material and of good hermetic sealing.

A further object of this invention is to provide a liquid crystal display device having surfaces of excellent chemical stability and good insulation.

According to one aspect of this invention, there is provided a liquid crystal display device comprising a pair of transparent substrates, transparent conductive films formed on inner surfaces of the substrates, coating layers of boron nitride with hexagonal crystal structure, formed on inner surfaces of the substrates and the conductive films, and a liquid crystal material interposed between the coating layers.

Figure 2:
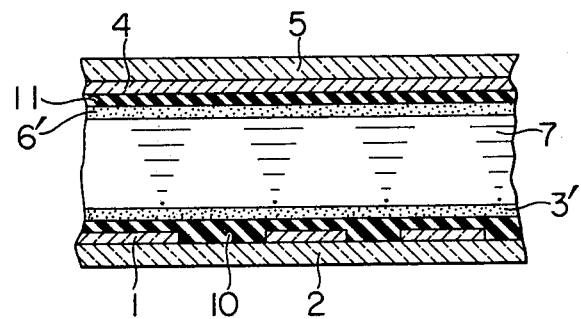

Other objects, features and advantages of the invention will be apparent from the following description taken in connection with the accompanying drawings, wherein:

FIG. 1 is a schematic cross section of a structure of a liquid crystal display device according to an embodiment of this invention; and FIG. 2 is a schematic cross section of a structure of a liquid crystal display device according to another embodiment of this invention.

Hereinbelow, this invention will be described on embodiments of the twisted type liquid crystal display device shown in FIGS. 1 and 2.

(Embodiment 1)

In FIG. 1, a transparent conductive film 1 is formed on a surface of a glass substrate 2 and etched in a pattern. This surface of the substrate 2 is rubbed in a certain direction with gauze adhered with a fine powder of boron nitride BN having an average diameter of the order of 1 $\mu$m to form a coating layer 3 of boron nitride BN. A transparent conductive film 4 is formed on a surface of another substrate 5. The surface of the substrate 5 is rubbed with BN powder in a direction at right angles to that of the other substrate to form a coating layer 6 of BN. The two substrates are assembled in a cell with a gap of about 10 $\mu$m. A nematic liquid crystal material 7 is interposed into this cell. When this twisted type liquid crystal display device was placed between a pair of polarizers disposed in the crossed Nicol arrangement and subjected to observation, the liquid crystal material 7 showed uniform alignment over the entire area of the cell.

Here, the substrate surfaces to be coated with BN should be clean. If the surface of a transparent conductive film such as indium oxide or tin oxide is cleaned by heat treatment, the adhesion of BN coating layer can be improved to be more uniform to provide a liquid crystal display device of good performance.

This BN material has a very high thermal decomposition temperature and is chemically very stable, being non-reactive with liquid crystal molecules. Therefore, the effective service life for alignment of the molecules of a liquid crystal material is very long and the manufacturing process for the cell becomes very easy.

Since the thermal decomposition temperature of BN is above 700°C, sealing glass can be used for sealing a pair of glass substrates 2 and 5 treated with BN particles. Generally available sealing glasses are usable at temperatures from 350° to 600°C, and hence can be used for effectively sealing the display cell. This is a unique characteristic as a method employing abrasion. When a sealing glass to be used at 450°C was adopted for sealing a display cell treated with BN, no difference was observed in the alignment of the liquid crystal molecules in comparison with those not subjected to heat treatment. According to the conventional method using polymers, polycarbonmonofluoride, etc., treatment at 200°C was critical and there were problems in the point of hermetic sealing.

(Embodiment 2)

In FIG. 2, a transparent conductive film 1 is formed on one glass substrate 2, similar to embodiment 1. An SiO$_2$ film 10 of a thickness 1000 A is deposited thereon as an insulating film. On this SiO$_2$ film 10, a coating layer 3' of BN was formed by a similar method as that of Embodiment 1. On the transparent conductive film 4 formed on the other substrate 5, an SiO$_2$ film 11 was also formed and a coating film 6' of BN is formed thereon by a similar method as that of Embodiment 1. Here, a film of silicon mono-oxide SiO or glass can be used in place of the silicon dioxide SiO$_2$ film 11.

The finer the particle size of said boron nitride BN the better. Further, a BN coating film is a good insulator. Thus, if the BN powder adheres to other surfaces of the glass substrates 2 and 5 than those coated with the transparent conductive films 1 and 4, the function as a display device cannot be disturbed in any manner.

The effect of surface alignment treatment with BN was more pronounced in the substrates of Embodiment 2 in which an insulating film of $SiO_2$ was further coated on the transparent conductive film of Embodiment 1. This is considered to be due to the mutual enhancement of the effects by the BN layer and the insulator layer since an insulating layer such as that of $SiO_2$ is desirable on a transparent conductive film from the point of service life and the deterioration by ultraviolet rays. In particular, the BN films 3' and 6' formed on the $SiO_2$ film could align the molecules of the liquid crystal material 7 with good reproducibility, and almost no disturbance for a display device such as cuts caused by rubbing on the surfaces of substrate and transparent conductive film or the threaded domain patterns caused by the difference in the alignment of liquid crystal molecules could be observed.

In the structure of Embodiment 2, a better BN coating was obtained by heat-treating the $SiO_2$ film to clean the surface. As the results of the experiments, very good results were obtained in the case where an $SiO_2$ film of a thickness 1000 A was deposited and subjected to heat treatment at about 400°C for about 1 hour. No observable defects were found in the alignment of the liquid crystal molecules in the display device manufactured by this experimental example. Under the observation by a 200 times magnification microscope, no disturbance in the alignment of the liquid crystal molecules and no existence of threaded domain patterns indicating different regions of molecular alignment could be observed over the entire display cell. When a liquid crystal material with a positive dielectric anisotropy having an a.c. threshold voltage of about 1.5 volts at a frequency of 32 Hz was used and a transient voltage of about 5 volts was applied, almost no occurrence of different regions which is a source of devitrification could be observed.

Further, such liquid crystal display devices could be manufactured with a far better reproducibility than those of the conventional ones and showed stable performances. Such a liquid crystal display device cannot be influenced by the size of the cell theoretically. In practice, a display device having a panel area of 15 cm × 15 cm was manufactured and yet liquid crystal molecules showed uniform alignment over the entire area.

(Embodiment 3)

In the structure of Embodiment 2, when sealing glass was used for sealing the liquid crystal display cell, since the working temperature in sealing was high the properties of the transparent electrode might appear to give some degree of effects in display such as degraded alignment although the electrode was covered with an $SiO_2$ film. This can arise when the thickness of the $SiO_2$ film is too thin. Such effects, however, could be eliminated by providing an $SiO_2$ film of a thickness not less than about 2000 A.

In place of the $SiO_2$ film to be coated with a BN layer, other materials may also be used such as a pyrex glass layer of a thickness not less than about 2000 A, SiO layer of a thickness not less than about 3000 A, $MgF_2$ layer of a thickness not less than about 3000 A, $CeO_2$ layer of a thickness not less than about 3000 A, $TiO_2$ layer of a thickness not less than about 3000 A, and $Y_2O_3$ layer of a thickness not less than about 2000 A, each of which may be formed by deposition. With these layers, a sealing glass may be used for sealing the cell to provide good results.

The reason for the fact that the liquid crystal molecules can be aligned with the use of BN particles may be considered as due to the fact that BN particles of layer structure adhere regularly on the surface of a glass substrate. Namely, when a surface of a glass substrate is rubbed in one direction with gauze, cloth, etc. and adhered with BN particles, hexagonal crystal structure BN particles cause uniformly sliding deformation in layered structure in said one direction, thereby resulting in a layer of directional BN particles adhered uniformly on the substrate.

Further, a better cell can be provided when excess BN particles are wiped off at the final step after the rubbing step. The glass substrate coated with these particles retains good adhesion for epoxy resin sealing, etc. and never cause inferior hermetic sealing.

In this respect, this invention should be compared with the conventional glass substrates provided with a surface film of polymer or polycarbonmonofluoride which do not show good adhesion for the adhesives such as epoxy resin and cannot provide perfect hermeticity of the display cell.

The glass substrate subjected to a surface alignment treatment with BN particles according to this invention was found to show good adhesion in the above point and to provide a display cell having good hermeticity. Further, since BN material does not contain water or moisture, this invention is particularly advantageous for the use of a liquid crystal material which is influenced by water.

While the alignment of the molecules of a liquid crystal material varies with time in a twisted type liquid crystal display cell consisting of substrates simply rubbed with gauze or cloth, the alignment of the molecules of a liquid crystal material in the liquid crystal display device subjected to the surface alignment treatment with BN according to this invention does not show time change semi-permanently due to the thermal stability of BN. Further, the service life thereof becomes very long due to the chemical stability of BN, not being reactive with a liquid crystal material.

Although description has been done on the twisted type liquid crystal display devices in Embodiments 1 and 2, it is apparent that the surface alignment treatment with BN particles according to this invention is also effective in the dynamic scattering mode type display device. In the dynamic scattering mode, the molecules of a liquid crystal material with a negative dielectric anisotropy can be aligned in one direction and the cell being transparent in the entire area in the absence of an electric field causes dynamic scattering under the application of an electric field to provide high contrast.

As has been described above, according to this invention the surface of a substrate provided with a transparent conductive film is rubbed with gauze, paper, cloth, etc. adhered with fine powder of boron nitride to adhere BN particles on the substrate and to give a preferred direction of alignment. A display device showing uniform alignment can be manufactured by a simple procedure. The service life for aligning the molecules of a liquid crystal material is long. The working surface is chemically stable and provides good insulation. Thus, the liquid crystal display device according to this invention has many advantageous effects in comparison with the display devices subjected with conventional surface alignment treatment. Therefore, this invention has a large industrial value.

What we claim is:

1. A liquid crystal display device comprising a pair of transparent substrates, transparent conductive films formed on inner surfaces of the substrates, coating layers of boron nitride with hexagonal crystal structure, formed on inner surfaces of said substrates and said conductive films, and a liquid crystal material interposed between said coating layers.

2. A liquid crystal display device according to claim 1, further comprising an insulation film intervening between said substrate or said conductive film and said boron nitride layer.

3. A liquid crystal display device according to claim 2, in which said insulation film is formed of silicon dioxide.

4. A liquid crystal display device according to claim 2, in which said insulation film is formed of a material selected from the group consisting of pyrex glass, silicon monooxide, magnesium difluoride, cesium dioxide, titanium oxide and yttrium oxide.

* * * * *